United States Patent Office 2,835,692
Patented May 20, 1958

2,835,692

STABILIZATION OF ORGANIC ISOCYANATES

Albert Bloom, Summit, N. J., Harlan B. Freyermuth, Easton, Pa., and James B. Normington, Little Silver, N. J., assignors to General Aniline & Film Corporation, New York, N. Y., a corporation of Delaware No Drawing. Application July 9, 1956
Serial No. 596,396

10 Claims. (Cl. 260—453)

The present invention relates to the stabilization of organic isocyanates. In particular it relates to the method of inhibiting polymerization and to the storage of organic isocyanates without decomposition.

Organic isocyanates are usually prepared by the reaction of phosgene with aliphatic and aromatic amines in an organic solvent such as, for example, o-dichlorobenzene at a temperature within the range of 50°–200° C. The reaction product thus obtained may be degassed by treatment with an inert gas and then subjected to fractional distillation of the solvent under vacuum to separate the isocyanate in relatively pure form.

Organic isocyanates begin to polymerize soon after they are prepared. In other words, they react with themselves to form dimers and polymers. Dimer and polymer formation is highly undesirable since they would give rise to by-products when reacted with organic compounds containing active hydrogen atoms.

Many attempts have been made to find conditions or agents that would stabilize organic isocyanates against undesired polymerization and decomposition in storage.

It has been proposed to stabilize them by the addition of an acyl halide, such as acetyl chloride in an amount of 0.3% to 5% based on the weight of the isocyanate, by the addition of carbamyl chloride in an amount from 0.02% to 0.06% of hydrolyzable chlorine based on the weight of the isocyanate, and by the addition of a phosphorus halide such as phosphorus trichloride or pentachloride in an amount from 0.05% to 5% based on the weight of the isocyanate.

The addition of any of the foregoing agents to an organic isocyanate, inhibits not only its polymerization but its reactivity in general. When such inhibited or stabilized isocyanates are utilized to make polyurethanes, polyamides, polyureas or mixtures of these, it is absolutely necessary to take into account the reduced reactivity of the organic isocyanates including poly-isocyanates. In view of these shortcomings considerable time and money is being spent by the chemical industry to devising means of stabilizing organic isocyanates that would not reduce the reactivity of the molecule. This is of considerable advantage and importance not only to the producer of the organic isocyanates, but equally as well to the consumer who uses it in the synthesis of diverse compounds of polymers and the like.

To provide a method of stabilizing organic isocyanates which will be stable against polymerization over extended periods of time and can be stored indefinitely, constitutes the principal object of the present invention.

Other objects and advantages will become evident from the following description:

We have discovered that organic mono-isocyanates, as well as organic poly-isocyanates are readily stabilized against polymerization and decomposition on storage by the addition to such isocyanates of an organic silicone compound. The organic silicone compound is insoluble in such isocyanates, and therefore, will not effect or inhibit the reactivity of the mono- or poly-isocyanate molecule, and as a consequence, the isocyanates can be stabilized for an indefinite period of time during storage. During the course of our extensive experimentation with the addition of organic silicone compounds to organic isocyanates, we have clearly established that the inhibition against polymerization and tendency to decompose upon storage is not due to the exclusion of air from contact with the isocyanate entirely but to some other phenomena which at the present time is not clearly understood. We have further ascertained that the effect of adding an organic silicone compound to the isocyanate is not entirely mechanical in its action, and can be readily demonstrated by blowing nitrogen through a sample of any isocyanate to effect the removal of all oxygen (air) and then stoppering the sample. On storage for several days at room temperature, there will be observed a precipitate of the polymer or a change in color indicating decomposition. A similar sample, as a control of the same isocyanate without blowing nitrogen to remove the air was treated by adding to it several drops of an organic silicone compound. After storage at room temperature for a month, there was no color change nor any precipitate of polymer.

The unusual feature of the addition of the organic silicone compound is that it is not necessary to pour it gently over the surface of the organic isocyanate contained in a retaining vessel. The addition may be at random regardless whether the liquid isocyanate, in the vessel, is still or under agitation. The organic silicone compound, in view of its insolubility in the isocyanate, always rises to the surface and forms a layer thereon. This is of considerable advantage when a tank car of an organic isocyanate is being transported. Despite the agitation, there will always be a sufficient layer which will inhibit polymerization and prevent degradation.

The types of organic silicone compounds that can be added to organic isocyanates are those that are insoluble in the isocyanates and have densities below 1.18. In other words, the density of the organic silicone compound should range between 0.930 and 1.18. The preferred types are exemplified by the following:

Alkyl silicone oils with a ratio of alkyl to silicon of 0.5–1.0 to 2.0–1.0.

Methyl silicone oils where the ratio of methyl to silicon is 1.7–1.0 to 2.0–1.0.

Ethyl silicone where the ratio of ethyl to silicon is from 0.5–1 to 2.0–1.

Propyl, butyl, and amyl silicones where the ratio of each of these radicals to silicon is from 1.5–1 to 2.0–1.0.

The same ratios apply to the alkyl-alkoxy silicone oils.

Each and every one of these silicones has a density less than 1.18 at room temperature. The organic silicones having this particular physical property are all oils and are characterized by the following general formula:

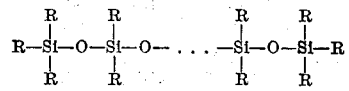

wherein R represents an alkyl group such as methyl, ethyl, propyl, butyl and amyl, or an alkoxy group such as methoxy, ethoxy, propoxy, butoxy and amyloxy groups, and wherein the polymer has a chain length ranging from 10 to 50 silicone units, i. e.

The chemistry and methods of preparation of the organic silicone compounds characterized by the above formula, i. e., polymeric organosiloxanes, are described by Burkhard et al., Chemical Reviews, vol, 41, No. 1, August 1947, pages 97–149, and by Rochov in his text book "Chemistry of the Silicones," pages 49–57 and 64–82, published by John Wiley, Inc., New York city.

As specific examples of such organic silicon compounds, the following are illustrative:

Methyl silicone oil
Ethyl silicone oil
n-Propyl silicone oil
Iso-propyl silicone oil
n-Butyl silicone oil
Iso-butyl silicone oil
Amyl silicone oil
Methyl ethyl silicone oil
Methyl propyl silicone oil
Methyl butyl silicone oil
Methyl amyl silicone oil
Ethyl propyl silicone oil
Ethyl butyl silicone oil
Ethyl amyl silicone oil
Propyl butyl silicone oil
Propyl amyl silicone oil
Butyl amyl silicone oil
Methoxy silicone oil
Ethoxy silicone oil
n-Propoxy silicone oil
Iso-propoxy silicone oil
Butyloxy silicone oil
Amyloxy silicone oil
Methoxy ethoxy silicone oil
Methoxy propoxy silicone oil
Methoxy butoxy silicone oil
Methoxy amyloxy silicone oil
Ethoxy propoxy silicone oil
Ethoxy butoxy silicone oil
Ethoxy amyloxy silicone oil
Propoxy butoxy silicone oil
Propoxy amyloxy silicone oil
Butoxy amyloxy silicone oil
Methyl methoxy silicone oil
Methyl ethoxy silicone oil
Methyl propoxy silicone oil
Methyl butoxy silicone oil
Methyl amyloxy silicone oil
Ethyl methoxy silicone oil
Ethyl ethoxy silicone oil
Ethyl propoxy silicone oil
Ethyl butoxy silicone oil
Ethyl amyloxy silicone oil
Propyl methoxy silicone oil
Propyl ethoxy silicone oil
Propyl propoxy silicone oil
Propyl butoxy silicone oil
Propyl amyloxy silicone oil
Butyl methoxy silicone oil
Butyl ethoxy silicone oil
Butyl propoxy silicone oil
Butyl butoxy silicone oil
Amyl methoxy silicone oil
Amyl ethoxy silicone oil
Amyl propoxy silicone oil
Amyl butyloxy silicone oil
Amyl amyloxy silicone oil The density of the foregoing silicone oils ranges between 0.930 and 1.18.

Since the organic silicone compounds are insoluble in the organic isocyanates, including poly-isocyanates, the amount to be employed is a function of the shape of the vessel containing the said isocyanates and can be very readily determined by calculation or by a spot experiment.

During our course of numerous experiments, we have found that an amount so little that it can be safely argued that at least a mono-molecular layer of the organic silicone compound is sufficient to inhibit polymerization and stabilize the isocyanate on storage. In other experiments, we have found that a layer of approximately 1/32", and in still others a layer of approximately 1/2" yielded the same satisfactory results. From these numerous experiments, we have concluded that the thickness of the layer is immaterial so long as at least a monomolecular layer is present. Under such conditions, stabilization of the organic isocyanates is readily attainable. In other words, the amount to be used for any given isocyanate is that quantity which by a simple spot experiment shows itself to be sufficient to inhibit the polymerization, and this amount will, of course, be dependent on the shape and size of the retaining vessel.

As examples of organic isocyanates which include mono-, di-, and tri-isocyanates that may be stabilized in accordance with the present invention, the following are illustrative:

Methylisocyanate
Ethylisocyanate
Propylisocyanate
Butylisocyanate
Amylisocyanate
n-Octylisocyanate
n-Dodecylisocyanate
n-Decylisocyanate
Cyclohexylisocyanate
Cetylisocyanate
n-Octadecylisocyanate
Benzylisocyanate
Naphthylmethylisocyanate
Decamethylenediisocyanate
Ethylenediisocyanate
Trimethylenediisocyanate
Tetramethylenediisocyanate
Propylenediisocyanate
Phenyl isocyanate
2-chlorophenylisocyanate
4-phenylphenylisocyanate
4-benzylphenylisocyanate
p-Phenethylisocyanate
a-Naphthylisocyanate
b-Naphthylisocyanate
Hexylisocyanate
Butylene-1,3-diisocyanate
Butylene-2,3-diisocyanate
Cyclo-hexylene-1,2-diisocyanate
Hexamethylenediisocyanate
m-Phenylenediisocyanate
p-Phenylenediisocyanate
o-Phenylenediisocyanate
2,4-toluenediisocyanate
2,6-toluenediisocyanate
Methylene-bis(4-phenylisocyanate)
1-chloro-2,4-phenylenediisocyanate
Diphenyl-3,3'-dimethyl-4,4'-diisocyanate
Diphenyl-3,3'-dimethoxy-4,4'-diisocyanate
1,3-phenylene diisocyanate
p-Dixylyl methane-4,4'-diisocyanate
1-methyl-phenylene-2,4-diisocyanate
Naphthalene 1,4-diisocyanate
Naphthalene 1,5-diisocyanate
Xylylenediisocyanate
4,4',4"-triphenyl methane triisocyanate
Benzene-1,2,4-triisocyanate
Triisocyanate made from p-fuchsin With regard to the foregoing mono- and poly-isocyanates it is to be noted that the nature or character of one or more substituents in the aliphatic chain or in the aromatic ring is immaterial. All such compounds, whether substituted or unsubstituted can be readily stabilized against polymerization and against decomposition with the aforementioned organic silicone compounds. As previously noted the only precaution to be observed is to be certain that the density of the silicone be below 1.18 at room temperature.

In order to more clearly illustrate the invention and to show the preferred mode of carrying the same into effect and the advantages resulting therefrom, the following examples are given:

*Example I*

A sufficient quantity of toluene di-isocyanate, consisting of 80% of the 2,4- and 20% of the 2,6-isomer was placed in a test tube one inch in diameter so that the tube was half filled. One drop of methyl silicone oil (sp. gr. 0.9708) was added. The test tube was stoppered and stored at room temperature. After one month there was no discoloration of the toluene di-isocyanate and no insoluble polymer formed. A control sample was prepared with the exception that no methyl silicone oil was added. Within two days the control sample became cloudy and deposited a precipitate polymer in three days.

*Example II*

Five separate test tubes one inch in diameter were half filled with toluene di-isocyanate, consisting of 80% of 2,4- and 20% of the 2,6-isomer and one drop of ethyl silicone oil (sp. gr. 0.980) added to each. A control sample was prepared except no silicone oil was used. The five samples and the control were placed in a rack and agitated for a period of five days. At the end of that time, the toluene di-isocyanate samples that had been stabilized were colorless and clear, whereas the control, containing no stabilizer had a deposit of polymer within one and one-half days.

*Example III*

Example I was repeated with the exception that the mixture of the toluene di-isocyanate isomers was replaced by toluene di-isocyanate consisting of 65% of the 2,4- and 35% of the 2,6-isomer and the methyl silicone oil was replaced by propyl silicone oil (sp. gr. 1.1120).

After one month there was no discoloration of the toluene di-isocyanate and no insoluble polymer formed. The control sample, containing no stabilizer, became cloudy within two days and deposited a precipitate polymer in three days.

*Example IV*

Example I was repeated with the exception that the toluene di-isocyanate mixture was replaced by phenylene tri-isocyanate.

After one month there was no discoloration of toluene di-isocyanate and no insoluble polymer formed. The control sample, containing no stabilizer, became cloudy within two days and deposited a precipitate polymer in three days.

*Example V*

Example I was again repeated with the exception that the toluene di-isocyanate was replaced by phenyl isocyanate and the methyl silicone oil was replaced by butyl silicone oil (sp. gr. 0.9560) with the same results.

*Example VI*

Example I was again repeated with the exception that the toluene di-isocyanate was replaced by naphthalene 1,5-di-isocyanate and the methyl silicone oil replaced by amyl silicone oil (sp. gr. 0.9450) with the same results.

*Example VII*

Example I was again repeated with the exception that the toluene di-isocyanate was replaced by hexamethylene di-isocyanate and the methyl silicone oil was replaced by methyl propyl silicone oil (sp. gr. 0.9555) with the same results.

*Example VIII*

Example I was again repeated with the exception that the toluene di-isocyanate was replaced by octylisocyanate and the methyl silicone oil was replaced by methyl ethoxy silicone oil (sp. gr. 1.1120) with the same results.

*Example IX*

Example I was again repeated with the exception that the toluene di-isocyanate was replaced by decamethylene di-isocyanate and the methyl silicone oil was replaced by butyl butoxy silicone oil (sp. gr. 0.9470) with the same results.

*Example X*

Example I was again repeated with the exception that the toluene di-isocyanate was replaced by naphthalene 1,5-diisocyanate and the methyl silicone oil was replaced by amyl propoxy silicone oil (sp. gr. 0.9460) with the same results.

By the term "organic isocyanates" as employed in the appended claims, we include the mono- and poly-isocyanates disclosed herein.

We claim:

1. A method of retarding the polymerization and decomposition of organic isocyanates which comprises adding thereto a stabilizing amount of a polymeric organosiloxane having the general formula:

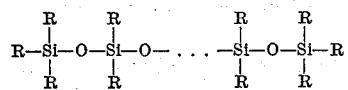

wherein R represents a member selected from the class consisting of alkyl and alkoxy groups of from 1 to 5 carbon atoms, said organosiloxane containing from 10 to 50

units in the polymer chain, and having a density below 1.18 at room temperature.

2. The method of retarding the polymerization and decomposition of organic isocyanates which comprises forming at least a mono-molecular layer, on the surface of said isocyanate contained in a retaining vessel, of a polymeric organosiloxane having the general formula:

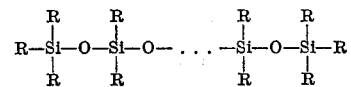

wherein R represents a member selected from the class consisting of alkyl and alkoxy groups of from 1 to 5 carbon atoms, said organosiloxane containing from 10 to 50

units in the polymer chain, and having a density below 1.18 at room temperature.

3. The method of retarding the polymerization and decomposition of organic mono-isocyanates which comprises adding thereto a stabilizing amount of a polymeric organosiloxane having the general formula:

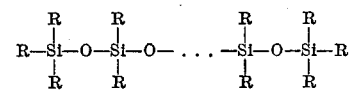

wherein R represents a member selected from the class consisting of alkyl and alkoxy groups of from 1 to 5 carbon atoms, said organosiloxane containing from 10 to 50

units in the polymer chain, and having a density below 1.18 at room temperature.

4. The method of retarding the polymerization and decomposition of organic diiocyanates which comprises adding thereto a stabilizing amount of a polymeric organosiloxane having the general formula:

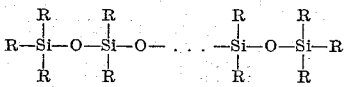

wherein R represents a member selected from the class consisting of alkyl and alkoxy groups of from 1 to 5 carbon atoms, said organosiloxane containing from 10 to 50

units in the polymer chain, and having a density below 1.18 at room temperature.

5. The method of retarding the polymerization and decomposition of organic triisocyanates which comprises adding thereto a stabilizing amount of a polymeric organosiloxane having the general formula:

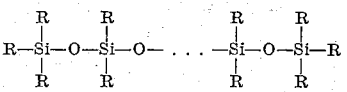

wherein R represents a member selected from the class consisting of alkyl and alkoxy groups of from 1 to 5 carbon atoms, said organosiloxane containing from 10 to 50

units in the polymer chain, and having a density below 1.18 at room temperature.

6. The method according to claim 2 wherein the organosiloxane is methyl silicone oil having a density of 0.9708.

7. The method according to claim 2 wherein the organosiloxane is ethyl silicone oil having a density of 0.9800.

8. The method according to claim 2 wherein the organosiloxane is propyl silicone oil having a density of 1.1120.

9. The method according to claim 2 wherein the organosiloxane is butyl silicone oil having a density of 0.9560.

10. The method according to claim 2 wherein the organosiloxane is methyl propyl silicone oil having a density of 0.9555.

References Cited in the file of this patent

UNITED STATES PATENTS

| | | |
|---|---|---|
| 2,437,867 | Verbanc | Mar. 16, 1948 |
| 2,476,779 | Sturgis | July 19, 1949 |

OTHER REFERENCES

Fiat Final Report No. 1301 (1947), Lockwood (page 2 relied on).

Banks: "Surface Films of Poly-Di-Methyl Siloxanes on Organic Liquid Substances," Nature, vol. 174, August 1954, p. 365–6.